March 10, 1959     A. A. BRAKE     2,876,577
FISH SPEAR
Filed Sept. 6, 1955
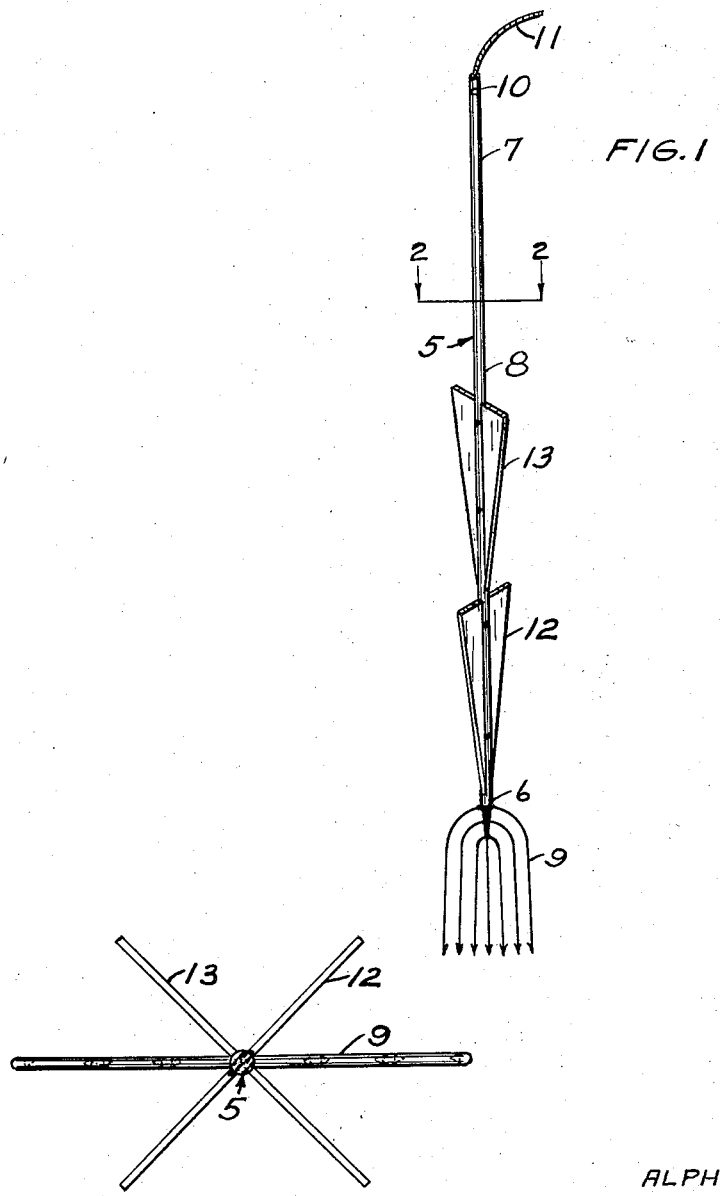
INVENTOR.
ALPHONS A. BRAKE
BY
Williamson, Schroeder, Adams & Meyers
ATTORNEYS

2,876,577
FISH SPEAR

Alphons A. Brake, Wilmont, Minn.

Application September 6, 1955, Serial No. 532,610

7 Claims. (Cl. 43—6)

This invention relates to fish spears. More particularly, it relates to fish spears for use in spearing fish through the ice.

In spearing fish through the ice, a hole is first chipped through the ice and the spearer manipulates a lure or decoy in the water below the hole by means of a suspending string. The fish become curious and approach these decoys, and in so doing pass beneath the opening, whereupon the spearer projects his spear downwardly through the water and into the fish. In so doing, however, the spear is often not truly vertically disposed or the thrust imparted to the spear is not truly in line with the length of the spear. This is especially true when the fish is wary and stops within the line of sight of the spear but not directly beneath the opening in the ice. When the spear is thrown in such instances, it often changes direction within the water from that initially imparted to it, with the net result that the fish escapes. My invention is directed toward overcoming these disadvantages.

It is a general object of my invention to provide a novel and improved fish spear.

A more specific object is to provide a novel and improved fish spear constructed to provide greater accuracy in spearing.

A still more specific object is to provide a novel and improved fish spear provided with means for precluding the spear changing direction appreciably while in flight through the water.

Another object is to provide guide means for a fish spear which will cause it to travel true to its mark as it passes through the water, regardless of the angle at which it is travelling.

Another object is to provide a fish spear provided with guide means which will cause it to travel true to its mark as it passes through the water, regardless of the effect of the trailing recovery line at the upper end of the spear.

These and other objects and advantages of the invention will more fully appear from the following description made in connection with the accompanying drawings, wherein like reference characters refer to the same or similar parts throughout the several views, and in which:

Fig. 1 is a perspective view of one embodiment of my invention; and

Fig. 2 is a sectional view taken along line 2—2 of Fig. 1.

One embodiment of my invention may include, as shown in Fig. 1, an elongated shank member indicated generally as 5. As shown, this shank member has a tine-carrying end portion 6, an opposite end portion 7 and an intermediate portion 8. Mounted on the end portion 6 is a plurality of barbed tines 9 which extend outwardly from the shank member. The extreme end portion of the opposite end portion 7 is hollow and an opening 10 is provided therein. A recovery line 11 extends inwardly through the hollow portion and outwardly through the open end 10 to enable a knot to be formed therein. Thereafter the knotted portion is drawn into the hollow portion so that the recovery line 11 will extend upwardly directly along the axis of the shank 5.

Mounted on the shank member 5 is a pair of flat, generally triangularly shaped fins or vanes 12 and 13. These vanes serve as guide members and extend longitudinally of the shank member, as shown in Fig. 1. The apex of the triangle of each of these vanes is closer to the tines 9 than is the base side thereof. These vanes extend through the plane of the shank member 5 and extend normally to each other. The vane 12 is disposed immediately adjacent the tines 9, while the vane 13 is disposed immediately adjacent the base of the vane 12. It will be noted that each of the vanes 12 and 13 extends laterally from the shank 5.

In use, the spear is thrown or projected through the water in the usual manner. As soon as the guide members or vanes 12 and 13 are submerged, they accurately and effectively guide the spear to the target without any appreciable deflection from the desired course. The spear will travel along the desired course to the target even though it is cast at an angle to the vertical, and despite the normal tendency of the spear to be deflected from its course. The arrangement of flat vanes to extend normal to each other insures that the shank will be guided through the water to prevent deviation from its course.

The triangular shape of the vanes 12 and 13 reduces the drag thereof to a minimum, and also increases their effectiveness as guiding elements. Their position adjacent the tine-carrying portion 6 and adjacent to each other causes them to take effect at once when the spear is thrown into the water and thus provides maximum effectiveness in their guiding function.

The disposition of the recovery line 11 so as to extend upwardly along the longitudinal axis of the shank 5 rather than laterally thereof also tends to reduce the tendency of the recovery line 11 to deflect the spear from its true and desired course.

It should be noted that the vanes 12 and 13, in addition to extending normally to each other, are each arranged so that neither extends in the same plane as the general plane of the tines 9. In other words, each of the vanes 12 and 13 extends in a plane different from that of the tines 9.

It will, of course, be understood that various changes may be made in the form, details, arrangement and proportions of the various parts without departing from the scope of my invention.

What is claimed is:

1. A fish spear comprising a shank member having opposite end portions, a plurality of barbed tines carried by one end portion of said shank and extending outwardly therefrom, and a pair of planar guide members mounted on said tine-carrying portion rearwardly of said tines and extending longitudinally of said tine-carrying portion, said guide members being spaced longitudinally of said tine-carrying portion and extending laterally of said shank member adjacent said tines to effectively and accurately guide said spear when projected through a body of water, said shank member extending parallel to the general planes of said guide members.

2. A fish spear comprising a shank member having opposite end portions, a plurality of barbed tines carried by one end portion of said shank and extending outwardly therefrom, and a pair of flat, generally triangularly shaped guide members mounted on said tine-carrying portion rearwardly of said tines and extending longitudinally of said tine-carrying portion, the apex of the triangle of each of said guide members being disposed closer to the tines than the base side of said members, said guide members extending laterally of said shank member and substantially normal to each other to effectively and accurately guide said spear when projected through a body of water, said shank member extending parallel to the general planes of said guide members.

3. A fish spear comprising a shank member having a tine-carrying portion and a handle portion and a pair of vanes mounted on said tine-carrying portion rearwardly of the tines and extending longitudinally of said tine-carrying portion, said vanes extending laterally of said shank member and substantially normal to each other and being spaced longitudinally of said shank member to effectively and accurately guide said spear when projected through a body of water, said shank member extending parallel to the general planes of said vanes.

4. A fish spear comprising a shank member having opposite end portions, a plurality of barbed tines carried by one end portion of said shank and extending outwardly therefrom, a pair of vanes mounted on said shank member adjacent to and rearwardly of said tines, and a second pair of vanes mounted on said shank member immediately behind said first-mentioned pair of vanes, said pairs of vanes extending laterally of said shank member and substantially normal to each other to effectively and accurately guide said spear when projected through a body of water.

5. A fish spear comprising a shank member having opposite end portions, a plurality of barbed tines carried by one end portion of said shank and extending outwardly therefrom and parallel thereto, and a pair of flat generally triangularly shaped vanes mounted on said tine-carrying portion and extending longitudinally thereof and rearwardly of said tines, the apex of the triangle of each of said vanes being disposed closer to said tines than the remainder of said vanes, said vanes being spaced longitudinally of said shank member and extending laterally thereof and substantially normal to each other to effectively and accurately guide said spear when projected through a body of water.

6. A fish spear comprising a shank member having opposed end portions, a plurality of barbed tines carried by one end portion of said shank and extending outwardly therefrom, a pair of vanes mounted on said shank member adjacent to and rearwardly of said tines, and a second pair of vanes mounted on said shank member behind said first mentioned pair of vanes, said pairs of vanes extending laterally of said shank member and substantially normal to each other to effectively and accurately guide said spear when projected through a body of water.

7. A fish spear comprising a shank member having opposed end portions, a plurality of barbed tines carried by one end portion of said shank and extending outwardly therefrom and parallel thereto, a pair of flat generally triangularly shaped vanes mounted on said tine-carrying portion and extending longitudinally thereof and rearwardly of said tines, a second pair of flat generally triangularly shaped vanes mounted on said shank member rearwardly of said first mentioned pair of vanes, the apex of the triangle of each of said vanes being disposed closer to said tines then the remainder of said vanes, said pairs of vanes being arranged longitudinally of said shank member and extending laterally thereof and substantially normal to each other to effectively and accurately guide said spear when projected through a body of water.

References Cited in the file of this patent

UNITED STATES PATENTS

| D. 114,893 | Goodeyne | May 23, 1939 |
| 2,212,345 | Krieger | Aug. 20, 1940 |
| 2,597,703 | Busacker | May 20, 1952 |